United States Patent [19]

Booher

[11] Patent Number: 4,718,693

[45] Date of Patent: Jan. 12, 1988

[54] COMPOSITE LEAF SPRING SUSPENSION WITH INTEGRAL SWAY BAR

[76] Inventor: Benjamin V. Booher, 1721 Aldersgate, Leucadia, Calif. 92024

[21] Appl. No.: 872,859

[22] Filed: Jun. 11, 1986

[51] Int. Cl.⁴ .............................................. B60G 11/04
[52] U.S. Cl. ..................................... 280/718; 267/149
[58] Field of Search .............. 280/718, 720, 688, 689; 267/148, 149, 36 R, 40, 47, 54 R

[56] References Cited

U.S. PATENT DOCUMENTS

| 237,721 | 2/1881 | Bay | 280/720 |
| 1,830,048 | 11/1931 | Barnard | 280/718 |
| 4,027,865 | 6/1977 | Greenwood et al. | 267/148 |
| 4,125,276 | 11/1978 | Levasseur | 280/718 |
| 4,445,957 | 5/1984 | Harvey | 156/180 |
| 4,457,500 | 7/1984 | Drachenberg et al. | 267/148 |
| 4,489,922 | 12/1984 | Fesko | 267/149 |
| 4,556,204 | 12/1985 | Pflederer | 267/148 |
| 4,565,356 | 1/1986 | Neckel | 267/148 |

FOREIGN PATENT DOCUMENTS

| 1205110 | 9/1960 | France | 280/718 |
| 2021731 | 12/1979 | United Kingdom | 267/149 |

*Primary Examiner*—David M. Mitchell
*Assistant Examiner*—Karin L. Ferriter
*Attorney, Agent, or Firm*—Baker, Maxham & Jester

[57] ABSTRACT

A vehicle suspension system includes a parallel set of pultruded composite leaf springs connected by a sway bar to minimize rolling of the vehicle body during turning. The rear ends of the springs are pivotally connected to shackles which are in turn pivotally connected to the vehicle frame and rigidly connected to opposite ends of the sway bar.

14 Claims, 1 Drawing Figure

U.S. Patent     Jan. 12, 1988     4,718,693
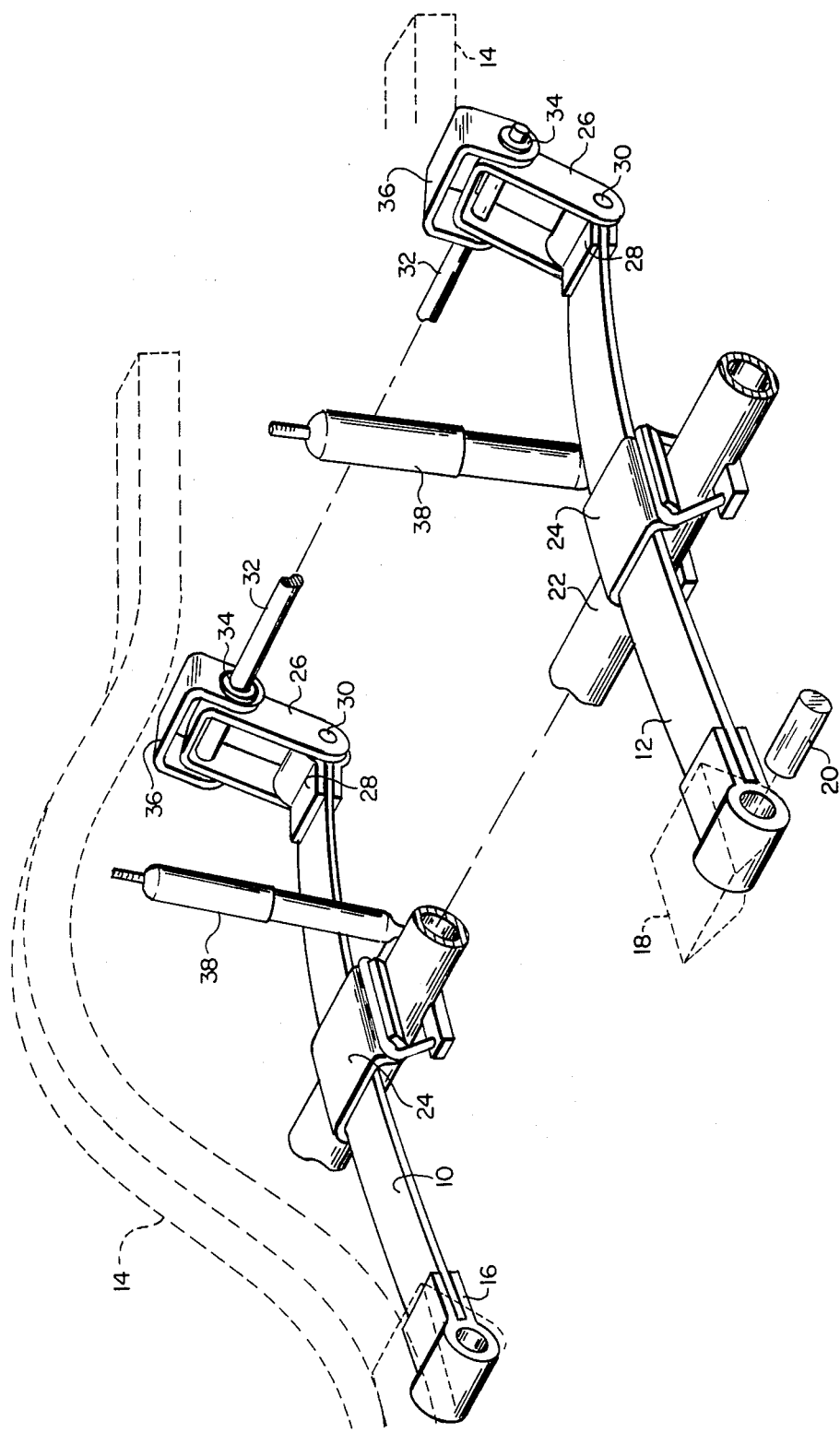

COMPOSITE LEAF SPRING SUSPENSION WITH INTEGRAL SWAY BAR

BACKGROUND OF THE INVENTION

The present invention relates to vehicle suspension systems, and more particularly, to an automotive suspension system in which composite leaf springs are used in conjunction with an integral sway bar.

Vehicle suspension systems have heretofore included shock absorbers, springs (coil, leaf, air or torsion bar), axle housing, torque arms, A-frames, anti-roll bars, stabilizers, and so forth. These components have been assembled in various combinations to produce the desired ride and handling characteristics of the vehicle. In a typical suspension system, changes in the spacing between axles and the body/chassis are cushioned by springs. Spring vibration is limited by dampers which are usually called shock absorbers. The shock absorbers dissipate the energy stored in the springs by gradually forcing oil through orifices and valves. The flow resistance encountered by the oil results in compression and rebound forces which control the spring movement. The work done by the oil as it moves through the values converts energy stored in the springs into heat which is dissipated from the shock absorbers into the surrounding air.

There is a continuing effort to reduce the manufacturing cost of automobiles. There is also a continuing effort to increase the mileage of automobiles through weight reduction. Both of the aforementioned efforts must not unduly sacrifice performance or reliability. Conventional suspension systems tend to have numerous expensive heavy metal parts. It is therefore desirable to reduce the cost, weight and complexity of existing suspension systems.

Automobile suspensions systems have heretofore been provided which have incorporated composite leaf springs. See for example U.S. Pat. Nos. 4,540,197 and 4,557,500. These composite leaf springs have been constructed by molding glass or other reinforcing fibers and a resin or other binder into the desired shapes. Typically such composite leaf springs have been made of a plurality of laminations. They have been molded or otherwise constructed with a particular curvature so that they assume a desired configuration under normal loading conditions. Thus, these types of composite leaf springs are relatively complex and expensive to construct.

It would be desirable to provide a vehicle suspension incorporating less expensive and composite leaf springs. Such a suspension system would also preferably incorporate a sway bar to limit body roll during cornering.

U.S. Pat. Nos. 1,990,802 of Thompson; 2,559,105 of Banning, Jr.; 3,142,598 of Rose; 3,456,939 of Duchemin; and 3,698,702 of Beck disclose other composite leaf constructions.

French Pat. No. 2,528,364 discloses twin fiberglass trailing arms for a rear wheel suspension. French Pat. No. 2,520,304 of Aubry disclose a transverse composite leaf spring arrangement.

Japanese Application No. 52-140771 discloses a leaf spring construction with metal and composite portions.

Swiss Pat. No. 305,921 discloses another transverse leaf spring suspension.

EPO Application No. 0 082 321 of Walter discloses another composite leaf spring construction.

SUMMARY OF THE INVENTION

It is therefore the primary object of the present invention to provide an improved vehicle suspension system.

Another object of the present invention is to provide an improved composite leaf spring suspension system.

Another object of the present invention is to provide a leaf spring suspension system with composite leaf springs that are simpler and less expensive to manufacture.

Another object of the present invention to to provide a composite leaf spring suspension system incorporating a sway bar.

According to the present invention, a pair of elongate springs have their forward ends connected to opposite sides of a vehicle frame. The springs extend in a longitudinal direction relative to the frame in spaced apart parallel relationship. The intermediate portions of the springs are rigidly connected to a transverse axle housing. A pair of shock absorbers dampen the motion of each of side of the axle housing relative to the frame. A sway bar extends transversely across the frame adjacent the rearward ends of the springs. A special mechanism connects the rearward end of each of the springs to a corresponding end of the sway bar to thereby transmit deflections of one spring to another to inhibit rolling of the vehicle frame relative to the axle housing during cornering.

BRIEF DESCRIPTION OF THE DRAWING

The drawing is a perspective view of the preferred embodiment of my composite leaf spring suspension system embodying my invention with portions broken away and parts illustrated in phantom lines for the sake of clarity.

DESCRIPTION OF THE PREFERRED EMBODIMENT

Referring to the drawing, a pair of composite leaf springs 10 and 12 are pivotally connected at their forward ends to the vehicle frame 14 via extruded alloy hinge elements 16, steel frame trunnions such as 18 and pins such as 20. While the springs are referred to a "leaf springs" they are not leaf springs in the traditional sense, i.e. they are not made up of a plurality of metal leaves clamped together but instead have a particular composite construction explained hereafter. This construction reduces both the weight and manufacturing cost of the springs. The illustrated suspension is adapted for the rear of a vehicle. The leaf springs extend longitudinally in spaced apart, parallel relation, above the rear axle housing 22. The leaf springs are rigidly attached intermediate their lengths to the axle housing by clamp assemblies 24. The rear ends of the leaf springs are pivotally connected to the lower ends of steel shackles 26 via extruded alloy hinge elements 28 and pins 30. The shackles 26 are rigidly connected to the ends of a transverse steel sway bar 32 which is journaled in isolation bushings 34. These bushings are made of a deformable, rubber-like material and are seated in holes in the arms of respective steel trunnions 36 connected to the frame 14. The shackles 26 thus pivot between the arms of their respective trunnions 36. The sway bar 32 is driven by shackles 26 which are actuated by movements of the composite springs 10 and 12. A pair of shock absorbers 38 connect the clamp assemblies 24 to the frame to dampen up and down motions of the axle housing 22 relative to the frame 14.

The leaf springs 10 and 12 are preferably made of composite material utilizing the pultrusion process. They may have one or more layers of woven, randomly dispersed, and longitudinally extending reinforcing fibers which are held together by a suitable binder. Suitable fibers include E-type glass, S-type glass, or graphite. Suitable binders include vinyl ester resin, filled epoxy resin, unfilled epoxy resin, and polyimide resin. The foregoing list of material is intended to be exemplary and not exclusive.

Pultrusion is a primary fabrication process for making continuous-length filament-reinforced plastic composite profiles. Reinforcing filaments, such as glass fiber roving, saturated with catalyzed thermoset resin, are continuously pulled through a shaped orifice in a heated steel die. As the two materials pass through the die, polymerization of the resin occurs and the result is the continuous formation of a rigid cured profile corresponding to the die orifice shape. Further details of the pultrusion process are found in my co-pending U.S. patent application Ser. No. 835,187 filed Mar. 3, 1986 and entitled "Vehicle Suspension System with Flexible Control Arm." The entire disclosure of the aforementioned application is specifically incorporated herein by reference.

By way of example, each of the leaf springs may have an upper woven fiber layer and a lower woven fiber layer sandwiching an intermediate layer of uni-directional, longitudinally extending fibers. The leaf springs are formed by cutting off segments of the pultruded form having the appropriate length and thereafter tooling the same to provide any other desired shape or features such as holes, etc. However, for reasons of economy it is desirable to avoid any necessity for tooling.

The leaf springs of my suspension are straight when formed and only assume their curved configurations illustrated in the drawing when under normal loading conditions. Deflections of one of the springs are transmitted to the other spring via the sway bar to inhibit rolling of the vehicle frame, i.e. rotation of the frame 14 relative to the axle housing 22 during cornering.

Having described a preferred embodiment of my invention it should be apparent that modifications and adaptations thereof will occur to those skilled in the art. Therefore, the protection afforded my invention should only be limited in accordance with the scope of the following claims.

I claim:

1. A vehicle suspension system comprising:
   a pair of elongate springs, each made of a composite material;
   means for connecting a forward end of each of the springs to a corresponding side of a vehicle frame so that the springs extend parallel in a longitudinal direction relative to the frame;
   means for rigidly connecting an intermediate portion of each of the springs to an axle housing extending in a transverse direction relative to the frame;
   shock absorber means connecting the axle to the frame for damping motion of the axle relative to the frame;
   a sway bar; and
   shackle means rigidly connected to each end of the sway bar for connecting a rearward end of each of the springs to a corresponding end of the sway bar for thereby transmitting deflections of one spring to the other by rotation of said sway bar for inhibiting rotation of the vehicle frame relative to the axle housing during cornering.

2. A vehicle suspension system according to claim 1 wherein the composite material has been pultruded.

3. A vehicle suspension system according to claim 1 wherein the springs are made of a pultruded composite material including an upper woven fiber layer and a lower woven fiber layer sandwiching an intermediate layer of unidirectional, longitudinally extending fibers.

4. A vehicle suspension system according to claim 1 further comprising means for pivotally connecting each shackle to the rearward end of the corresponding spring and means for pivotally connecting the shackles to the vehicle frame.

5. A vehicle suspension system according to claim 4 wherein the means for connecting the forward ends of the springs to the vehicle frame permits the forward ends to pivot relative to the frame.

6. A vehicle suspension system according to claim 1 wherein the springs are each made of a pultruded composite material and is normally straight but curves under normal loading conditions encountered in the suspension system.

7. A vehicle suspension system according to claim 1 wherein the springs are made of a composite material having at least one layer of woven fibers and one layer of longitudinally extending fibers held together by a binder.

8. A vehicle suspension system according to claim 7 wherein the fibers are selected from the group consisting of E-type glass, S-type glass and graphite.

9. A vehicle suspenion system according to claim 7 wherein the binder is selected from the group consisting of vinyl ester resin, filled epoxy resin, unfilled epoxy resin and polyimide resin.

10. A vehicle suspension system, comprising:
    a pair of elongate springs, each spring consisting of a single leaf having a uniform cross-section throughout its length and formed of a composite material;
    means for connecting a forward end of each of the springs to a corresponding side of a vehicle frame so that the springs extend parallel in a longitudinal direction relative to the frame;
    means for rigidly connecting an intermediate portion of each of the springs to an axle housing extending in a transverse direction relative to the frame;
    shock absorber means connecting the axle to the frame for damping motion of the axle relative to the frame;
    a sway bar; and
    shackle means rigidly connected to each end of the sway bar for connecting a rearward end of each of the springs to a corresponding end of the sway bar for thereby transmitting deflections of one spring to the other by rotation of said sway bar for inhibiting rotation of the vehicle frame relative to the axle housing during cornering.

11. A vehicle suspension system according to claim 10 wherein the springs are made of a pultruded composite material including an upper woven fiber layer and a lower woven fiber layer sandwiching an intermediate layer of unidirectional, longitudinally extending fibers.

12. A vehicle suspension according to claim 11 further comprising means for pivotally connecting each shackle to the rearward end of the corresponding spring and means for pivotally connecting the shackles to the vehicle frame.

13. A vehicle suspension system according to claim 12 wherein the means for connecting the forward ends of the springs to the vehicle frame permits the forward ends to pivot relative to the frame.

14. A vehicle suspension system, comprising:
a pair of elongate springs, each made of a pultruded composite material, including an upper woven fiber layer and a lower woven fiber layer sandwiching an intermediate layer of unidirectional, longitudinally extending fibers;
means for connecting a forward end of each of the springs to a corresponding side of a vehicle frame so that the springs extend parallel in a longitudinal direction relative to the frame;
means for rigidly connecting an intermediate portion of each of the springs to an axle housing extending in a transverse direction relative to the frame;
shock absorber means connecting the axle to the frame for damping motion of the axle relative to the frame;
a sway bar; and
means for connecting a rearward end of each of the springs to a corresponding end of the sway bar for thereby transmitting deflections of one spring to the other by rotation of said sway bar for inhibiting rotation of the vehicle frame relative to the axle housing during cornering, comprising a pair of shackles each rigidly connected to the corresponding end of the sway bar, means for pivotally connecting each shackle to the rearward end of the corresponding spring and means for pivotally connecting the shackles to the vehicle frame.

* * * * *